United States Patent [19]
Valentine

[11] 3,736,842
[45] June 5, 1973

[54] BREATHING AND FAILURE DETECTION SYSTEM FOR SPRING BRAKES
[75] Inventor: Harry M. Valentine, Elyria, Ohio
[73] Assignee: The Bendix Corporation, South Bend, Ind.
[22] Filed: Feb. 22, 1972
[21] Appl. No.: 228,024

[52] U.S. Cl. .............................. 91/1, 91/399, 92/5, 92/63, 92/64, 303/9, 303/6 M
[51] Int. Cl. ........ F01b 25/26, F01b 7/00, F01b 21/02
[58] Field of Search .......................... 92/64, 61, 5, 63; 91/170, 399, 1; 303/9, 6 M

[56] References Cited
UNITED STATES PATENTS

| | | |
|---|---|---|
| 3,406,609 | 10/1968 | Cox .......................................... 92/63 |
| 3,090,359 | 5/1963 | Hoppensland ...................... 303/6 M |
| 3,502,003 | 3/1970 | Dubrikin et al. ......................... 92/63 |

Primary Examiner—Martin P. Schwadron
Assistant Examiner—A. M. Zupcic
Attorney—Ken C. Decker and William N. Antonis

[57] ABSTRACT

A service and spring brake actuator including service and spring brake chambers arranged in tandem, the spring brake chamber including a spring cavity and a control cavity and wherein valve means are provided for interconnecting the spring cavity with the service chamber and the control chamber during operation of the spring brake actuator in order to prevent the entry of dirt and other foreign matter into the spring cavity. Means are also provided for automatically indicating a failure or loss of load of the main spring and failure or serious leakage of the seal between the control and spring cavities.

8 Claims, 5 Drawing Figures

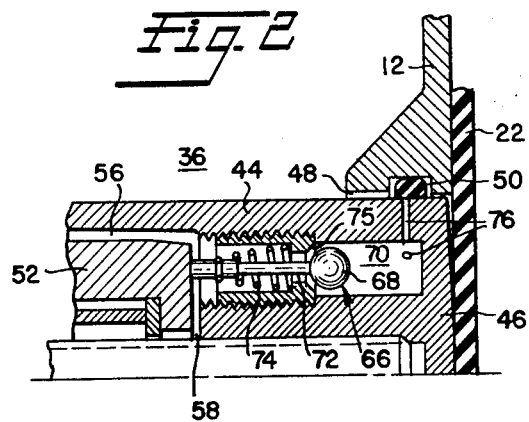
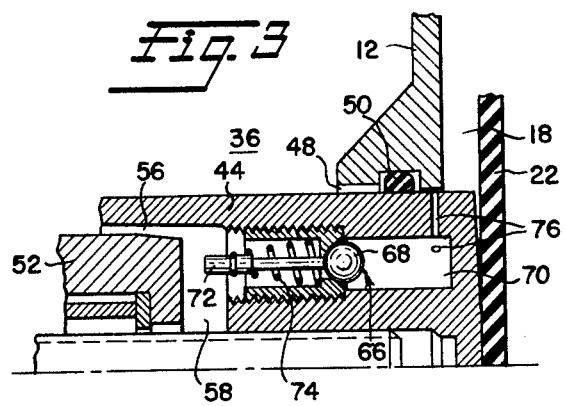
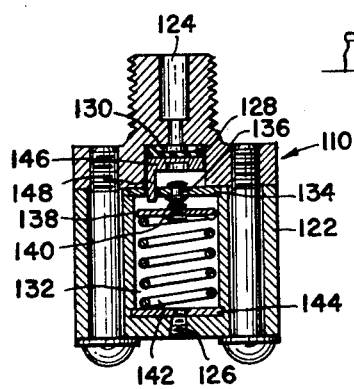
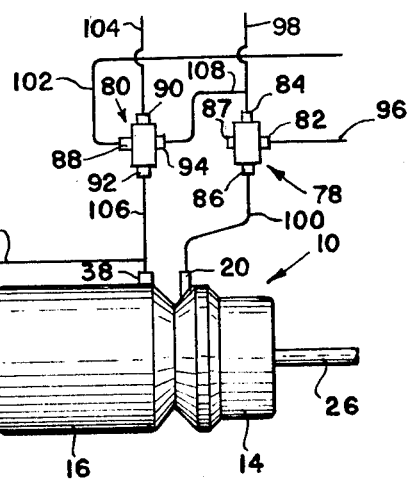

BREATHING AND FAILURE DETECTION SYSTEM FOR SPRING BRAKES

DESCRIPTION OF THE INVENTION

Tandem service and spring brake actuators have heretofore been provided and one of the serious problems in the operation of such devices has been the accumulation of dirt and moisture within the spring cavity of the spring brake actuator. This is due to the use of open vents for the spring cavity in order to allow flow of outside air to and from the cavity during spring brake application and release. It will be readily understood that such dirt and moisture results in corrosion and deterioration of the parts of the spring actuator so that frequent servicing thereof has been necessary. While attempts have been made to solve this problem, they have not been entirely satisfactory due to complications in design.

The present invention is directed to a novel breathing and failure indicating system for spring brake actuators of the above type and one of the objects of the invention is to allow the flow of air from within the actuator assembly to and from the spring cavity so that dirt and moisture present in the outside air is not delivered to the spring control or connecting cavities.

Another object of the invention is to provide a breathing system of the above character which incorporates a novel valve construction for allowing air flow from the spring cavity to the service brake chamber during spring brake application.

Another object of the invention is to provide a breathing system of the above character wherein the novel valve construction allows air flow from the spring brake control cavity to the spring cavity and failure detection means during the last portion of the stroke of the spring brake actuator during release thereof.

Another object of the invention is to provide a means of automatically detecting and visibly and/or audibly indicating a failure of or loss of load in the main spring, or a failure of or leak in the common air seal between the control and spring cavities.

A further object is to provide a breathing control valve which will be operative to prevent air flow from the service actuator to the spring cavity when the spring brake actuator is in its applied position.

Other objects and novel features of the invention will appear more fully hereinafter from the following detailed description when taken in connection with the accompanying drawings illustrative of one form of the invention. It will be expressly understood however, that the drawings are not to be taken as a definition of the limits of the invention, reference being had for this purpose to the appended claims.

Referring to the drawings wherein similar reference characters denote similar parts throughout the several views:

FIG. 2 is an enlarged partial view in section of the breather valve and associated parts when the spring actuator is moved to a brake released position;

FIG. 3 is a view similar to FIG. 2 and illustrating the position of the parts when the spring actuator is moved toward its brake applying position;

FIG. 4 is a diagrammatic view of the actuator of FIG. 1 in combination with a novel valve arrangement for controlling the actuator together with the novel failure detection means, and FIG. 5 is a sectional view of a pressure differential switch which may be employed in connection with the failure detection system of the invention.

Figure 1:
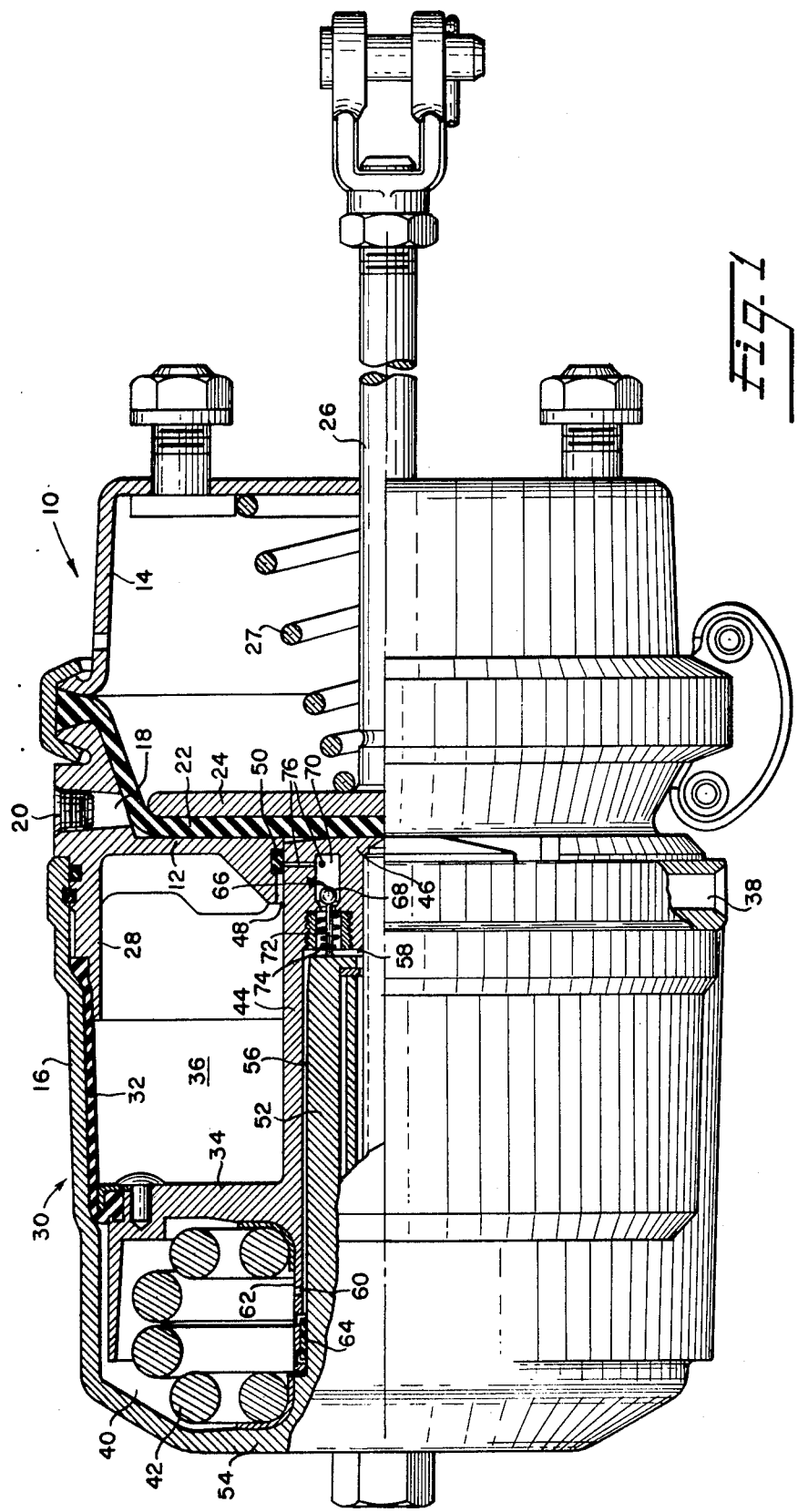
FIG. 1 is an axial view partly in elevation and partly in cross-section of a combined service brake and spring brake actuator incorporating the novel features of the invention.

Referring now to the drawings, the numeral 10 designates broadly the housing of a combined service brake and spring brake actuator. The housing is divided by a central wall 12 into a service actuator part 14 and a spring actuator part 16. The service part 14 includes a service pressure chamber or cavity 18 which is adapted to be connected to the usual brake pedal by way of a port 20. When service pressure is delivered to the pressure chamber 18 it operates on a diaphragm 22 to exert a brake applying force on a push plate 24 and push rod 26 against the force of a return spring 27 to apply the brake in a manner well recognized in the art.

Integral with the wall 12 is a stepped lip 28 which is telescopically received within the annular opening defined by the open end of a hollow spring brake cylinder 30 which is divided by a diaphragm 32 and a piston portion 34 into a pressure chamber or control cavity 36 adapted to be connected to a source of emergency fluid pressure by way of a port 38 and a spring chamber 40 containing a brake applying spring 42.

Integral with the piston 34 is a forwardly extending sleeve or shaft 44 the forward end 46 defining a brake applying abutment with the sleeve 44 being slidably and sealably received in a central opening 48 in the wall 12 separating the service and pressure cavities 18 and 36 and annularly grooved to receive an O-ring 50 which serves to seal the cavities 18, 36 from each other. As shown, a fixed sleeve 52 extends forwardly from the rear wall 54 of the cylinder 30 and is positioned within the sleeve 44 with clearance defining an annular passage 56 connecting a cavity 58 at the forward end of the sleeve 44 with the spring chamber 40 by way of a series of ports, one of which is shown at 60, said port being provided in a rearward extension 62 of sleeve 44. A suitable bearing 64 is carried by the extension 62 and engages the fixed sleeve 52.

The novel breathing valve of the present invention is illustrated in FIGS. 1 and 2 as comprising a check valve 66 carried by the sleeve 44 so as to be movable with the spring piston 34. More particularly, the check valve 66 includes a valve head 68 positioned within a valve cavity 70, the head 68 being secured to a stem 72 which is provided with a spring 74 which constantly tends to urge the head 68 into seating engagement with a valve seat 75 in order to interrupt communication between the cavities 70 and 58. The outer end portion of the sleeve 44 is provided with one or more radial holes 76 which connect the valve cavity 70 with the control cavity 36 or the service cavity 18 depending upon the axial position of the sleeve 44. As shown in FIGS. 1 and 2 the spring piston 34 occupies its released position by reason of the admission of fluid pressure to the control cavity 36. In such position, the holes 76 are partially uncovered by the seal 50 so that the excess of fluid pressure within the control cavity 36 above that required to compress the spring 42 to the desired release position flows through holes 76, cavity 70, past open check valve 66 and into the spring cavity 40 via cavity 58, passage 56 and ports 60, it being pointed out that as the spring piston 34 and sleeve 44 approach the release position, the valve stem 72 abuts the fixed sleeve 52 in order to move the valve head 68 off the seat 75. Piston 34 never moves any further to the left, as viewed in FIGS. 1 and 2 than as shown and therefore does not contact any fixed stop. Thus, the spring cavity 40 is charged with the excess of fluid pressure above that required in the control chamber 36 to move the spring piston to the desired release position. It will be understood that when such excess pressure is built up in the spring cavity, the piston 34 will move slightly to the right to lap the valve comprising holes 76 and seal 50 when such excess pressure plus the load of the spring 42 is slightly greater than the pressure applied to the control cavity 36.

During spring brake operation of the spring actuator 16, as shown in FIGS. 1 and 2, it will be understood that when fluid pressure is released from the control cavity 36, the piston 34 and sleeve 44 will be moved to the right. During such movement, the holes 76 move to the right of seal 50 as shown in FIG. 3 in order to communicate with the service chamber 18. The valve spring 74 attempts to close the check valve 66 but the surplus pressure in the spring cavity 40 maintains it in open position and such pressure is exhausted through the holes 76 into the service cavity 18 and finally to atmosphere via the exhaust port of the brake valve. When the pressure within the spring cavity 40 is finally dissipated, the spring 74 moves the valve head 68 onto the seat 75 to close the check valve 66.

In the position shown in FIG. 1, it will be understood that a service application of the service actuator 10 may be effected by merely operating the usual brake valve to charge the service chamber 18.

When it is desired to release a spring brake application, fluid pressure is admitted to the control chamber 36 via the usual spring brake control valve and the parts will be restored to the position illustrated in FIG. 1. During this action residual fluid pressure within the spring chamber 40 will flow to the service chamber 18 via holes 60, passage 56, cavity 58, check valve 66, cavity 70 and holes 76. As the holes 76 approach the seal 50, the valve stem 72 abuts the sleeve 52 to open the check valve 66 so that when the holes 76 finally pass under and are partially uncovered by the seal 50, the excess of fluid pressure above that required to move the spring piston 34 to the desired release position flows to the spring cavity 40 as heretofore described.

Referring now to FIG. 4, the combined service and spring brake actuator 10 described above is shown therein in combination with a novel valve arrangement for controlling the application of fluid pressure to and from the service chamber 18 and the control chamber 36 of the spring actuator 16. More particularly, the valve arrangement includes a pair of valves 78 and 80 which are of the quick release type shown in U.S. Pat. No. 2,718,897 granted to Earl T. Andrews on Sept. 27, 1955. Valve 78 is provided with an inlet port 82, a pair of outlet ports 84, 86 and an exhaust port 87, while the valve 80 is similarly provided with an inlet port 88, a pair of outlet ports 90, 92 and an exhaust port 94. The inlet port 82 is connected to a conventional brake valve (not shown) by a conduit 96 while the outlet ports 84 and 86 are respectively connected by conduits 98 and 100 with the service portions 14 of one or more tandem spring brake actuators constructed as heretofore described, one such actuator being shown at 10 in FIG. 4. Valve 80 has its inlet port 88 connected with a conventional spring brake parking control valve (not shown) by a conduit 102 while the outlet ports 90 and 92 of valve 80 are respectively connected by conduits 104 and 106 with the ports 38 of the spring brake portions 16 of the tandem actuators 10. The exhaust port 94 of the valve 80 is connected to the conduit 98 and 100 by a conduit 108 so that whenever the brake valve is operated to charge the conduits 98 and 100 to effect a service application of the tandem actuators 10, fluid pressure will be simultaneously conducted to the ports 38 of the spring brake actuator portions 16, assuming of course that the conduit 102 has been exhausted to allow a spring brake application of the portion 16 of the actuator 10. In this manner, as the service brake portion 14 is applied, the spring brake application is released by and in proportion to the fluid pressure admitted to the ports 38 thus preventing a compounding of spring brake and service brake pressures.

In operation of the system shown in FIG. 4, it will be understood that the spring brake portion 16 is normally maintained in a released position by operation of the spring brake parking control valve which charges the conduit 102 and through operation of the valve 80, also charges the conduits 104 and 106. Fluid pressure thus admitted to the control cavity 36 of the actuators 10 will therefore maintain the springs 42 in a compressed and inactive condition. Normal service application of the service portion 14 may be effected by operating the brake valve to charge the conduits 98 and 100 through the valve 78. Since the exhaust port 94 of the valve 80 will be closed by the pressure at port 88, the charging of conduit 108 will have no effect. In the event however, that the spring brake control valve is moved to the park position to exhaust conduit 102, the control chamber 36 will be exhausted to atmosphere by way of the conduit 106, exhaust port 94 of valve 80, conduit 108, conduit 98 and the exhaust port 87 of the valve 78. Thus the spring 42 will be effective to apply the brakes by spring pressure and during this operation, the spring chamber 40 will be connected with the service chamber 18 by operation of the valve 66 as heretofore described.

It will also be understood that the valve arrangement of the system of FIG. 4 is such that the compounding of service and spring brake forces is prevented. For example, with the spring brake applied, as just described, a service brake application may be effected by operating the brake valve to charge the conduit 96 and conduit 100 leading to the service actuator portion 14 through the valve 78 which functions to close the exhaust 87 and connect the outlet ports 84 and 86 to the inlet port 82. Fluid pressure will also be conducted to the control chamber 36 of the spring brake portion 16 by way of the exhaust port 94 of the valve 80 and the outlet ports 90 and 92, it being understood that when fluid pressure is admitted to the exhaust port 94, the inlet port 88 of the valve 80, which was previously connected with the atmosphere, is closed. Thus, fluid pressure within the control chamber 36 will release the spring brake action as the service portion is applied and compounding of the braking forces due to spring action and service brake application will be avoided.

As shown in FIG. 4, a conventional differential pressure switch 110 may be connected to the conduit 106 and the spring cavity 40 by respective conduits 112 and 114 to energize a signal 116 in a circuit including battery 118 and ignition switch 120 in order to indicate an application of the spring brake or a failure of the spring 42 or diaphragm 32.

More particularly, and referring to FIGS. 4 and 5, the differential pressure switch 110 includes a housing 122 having a first port 124 connected with conduit 112 and a second port 125 connected with conduit 114, and also having a pressure responsive O-ring diaphragm 128 therein separating the interior of the housing into a cavity or chamber 130 and a chamber 132. A contact plate 134 carrying a contact 136 is fixed in the housing and a contact disc 138 carrying a contact 140 is normally urged by a spring 142 toward a position where contacts 136 and 140 are engaged. The opposite end of the spring 142 engages a contact member 144 and the plate 134 and member 144 are connected to the battery 118 and signal 116 to complete the circuit to the latter when the contacts 136 and 140 are engaged and the ignition switch 120 is closed. Desirably, the plate 134 and the member 144 are insulated from each other so that the electrical circuit is completed through the spring 142 when the contacts are closed. As shown, a piston 146 engages the diaphragm 128 and is provided with a finger 148 for engaging the contact disc 138 and separating the contacts 136 and 140 when the pressure in the conduit 112 and hence the control cavity 36 exceeds the pressure in the spring cavity 40 by a predetermined amount. The area of the diaphragm 128 subject to the opposing pressures in the cavity 130 and the chamber 132 and the spring force of the spring 142 are such that the contacts 136, 140 will be opened when the pressure in control cavity 36 is greater than the pressure within the spring cavity 40 by an amount sufficient to move the spring piston 34 to the desired release position.

In normal operation, a spring brake application is effected by exhausting conduits 102 and 106 as heretofore described. Thus conduit 112 is exhausted to atmosphere as is the conduit 114 and in the absence of any fluid pressure within the cavity 130 and chamber 132 of the pressure switch 110, the contacts 136 and 140 are closed by the spring 142 thus energizing the signal 116 and providing an indication of spring brake operation of the vehicle brake.

To release a spring brake application, fluid pressure is applied to the control cavity 36 as above described and this same pressure is applied to the cavity 130 to overcome the effect of the spring 142 causing the contacts 136, 140 to open. Fluid pressure admitted to the control cavity 36 in excess of that required to move the piston 34 to the release position will spill over into the spring cavity 40, as heretofore described, to maintain the fluid pressure differential across the piston. This spill-over is also conducted to the chamber 132 of the pressure switch 110 to maintain a similar differential across the diaphragm 128 and therefore, the contacts 136, 140 remain open and the signal 116 remains deenergized. In this manner, the signal 116, which may be a light or an audible alarm will indicate a spring brake application or a release of the vehicle brakes.

In the event however, that the spring 42 of the spring brake is broken and with the control cavity charged with fluid pressure, it will be understood that the pressures within the control cavity 36 and the spring cavity 40 will equalize. This is due to the fact that the spring will not be able to lap the valve 50, 76 which will remain open. Hence, no pressure differential will be developed in the chambers 130 and 132 of the pressure switch 110 and the spring 142 will close the contacts 136, 138 to energize the signal 116. The latter will also be energized in the event that the diaphragm 32 developes a leak such that the pressures within the cavities 36 and 40 equalize regardless of the lapping of the valve 50, 76 by the spring 42. Thus it is seen that the failure detection system illustrated in FIG. 4 provides a visual or audible indication of the failure of the spring brake whether it be caused by a broken spring or a leaky diaphragm which normally seals the chambers 36 and 40 from each other.

From the foregoing, it will be readily seen that the invention provides a novel breathing system and a failure indicating system for the spring brake portion of a tandem spring brake and service actuator wherein fluid entering the spring cavity is derived from the fluid brake system, thus avoiding the possibility of the entrance of dirt and moisture. The provision of the novel breather valve serves to connect the spring cavity with the control cavity to insure flow of clean air to the spring cavity as the spring is compressed to release a spring brake application. The construction is also such that the clean air in the spring cavity is exhausted into the service brake chamber during a spring brake application. In addition, the novel check valve allows residual pressure in the spring cavity to flow into the service brake chamber during compression of the spring during brake release up to the time when the spring cavity is again connected with the control cavity. The invention also provides a detection system for indicating to the operator a broken spring or leaky diaphragm in the spring actuator, it being understood that a failure of the spring brake would occur upon the happening of the former of these events and that an automatic application of the spring brake would occur upon the happening of the latter of these events.

While one embodiment of the invention has been shown and described herein, it will be understood that the scope thereof is to be determined by the appended claims.

What is claimed is:

1. In a tandem spring and service brake actuator for applying a vehicle brake, comprising a service actuator provided with a fluid pressure receiving chamber having a brake applying element therein, a spring actuator having a piston dividing the latter into a fluid pressure control cavity and a spring cavity, a piston rod connected with said piston and arranged to actuate the brake applying element of said service actuator and a spring within the spring cavity for operating said piston in one direction to apply the brake when fluid pressure is released from said control cavity, application of fluid pressure to said control cavity moving said piston in the opposite direction and compressing said spring to release the brake, the invention which comprises valve means for connecting said chamber and spring cavity during spring operation of said piston to apply the brake when fluid pressure is released from said control cavity and for connecting said control cavity and spring cavity when fluid pressure is applied to said control cavity to compress said spring and release the brake.

2. The actuator of claim 1 wherein said valve means includes a spring-closed check valve carried by said piston rod, and a stationary part for opening said check valve to connect the spring cavity and control cavity when said piston is moved in said opposite direction to a predetermined position.

3. The actuator of claim 2 which includes an interior wall within the actuator separating the chamber and control cavity, said piston rod including a hollow sleeve passing through an opening in said wall and having an end portion for actuating said brake applying element and wherein said valve means includes a seal carried by said wall and engaging said sleeve.

4. The actuator of claim 3 which includes a valve cavity in communication with said spring cavity when said check valve is open, said sleeve being provided with an opening arranged to be uncovered by said seal to connect said valve cavity and said control cavity when said piston is moved in said opposite direction to compress the spring.

5. The actuator of claim 4 wherein said opening is arranged to connect the valve cavity and chamber when the piston is moved in said one direction.

6. The actuator of claim 1 which includes means for supplying fluid pressure to said chamber, and means dependent upon operation of the last named means for supplying fluid pressure to said control cavity after the brake has been applied by spring operation of said piston.

7. The actuator of claim 1 which comprises in addition a detection system for indicating failure of said spring actuator comprising a pressure differential switch subjected to opposing pressures in said control and spring cavities, a signal, and electrical circuit means interconnecting said switch and signal.

8. The actuator of claim 7 wherein said switch is constructed and arranged to close when the pressures in said control and spring cavities are substantially equal.

* * * * *